United States Patent [19]
Naughton

[11] Patent Number: 5,135,143
[45] Date of Patent: Aug. 4, 1992

[54] COMBINED CYCLE RACK AND PARKING STAND

[76] Inventor: Gary B. Naughton, 2277 Dunstan St., Oceanside, Calif. 92054

[21] Appl. No.: 595,589

[22] Filed: Oct. 11, 1990

[51] Int. Cl.$^5$ ................................ B62J 7/04
[52] U.S. Cl. ................... 224/31; 224/32 R; 224/39
[58] Field of Search ............ 224/31, 32 R, 32 A, 224/33 R, 39, 40, 42, 42.01, 151, 917

[56] References Cited

U.S. PATENT DOCUMENTS

| | | | |
|---|---|---|---|
| 460,332 | 9/1891 | Coates | 224/39 |
| 3,547,325 | 12/1970 | Hill | 224/39 |
| 3,572,758 | 3/1971 | Lee | 224/31 X |
| 3,659,761 | 5/1972 | Wesson | 224/39 |
| 4,296,878 | 10/1981 | Ward et al. | 224/32 A |
| 4,349,138 | 9/1982 | Bruhn | 224/39 X |
| 4,792,072 | 12/1988 | Gibson | 224/32 A |
| 4,928,863 | 5/1990 | Morgan | 224/39 |
| 4,948,020 | 8/1990 | Smith | 224/31 |

FOREIGN PATENT DOCUMENTS

| | | | |
|---|---|---|---|
| 898864 | 4/1970 | Canada | 224/917 |
| 335796 | 9/1903 | France | 224/39 |
| 640539 | 7/1928 | France | 224/31 |
| 834899 | 9/1938 | France | 224/33 R |
| 1534010 | 7/1968 | France | 224/39 |
| 40932 | 6/1937 | Netherlands | 224/32 A |

Primary Examiner—Henry J. Recla
Assistant Examiner—Robert M. Fetsuga

[57] ABSTRACT

A two-wheeled cycle carrier rack having an elongated frame member with a bracket at one end which cantilever mounts to a seat and seat post of the cycle, a loop at the other end which can receive a surfboard, and a nose piece intermediate the bracket and loop for receiving a portion of the surfboard. The carrier rack also functions as a parking stand for the cycle when the bracket is removed from the seat and seat post and reattached to a portion of the cycle frame with the loop engaging the ground.

1 Claim, 5 Drawing Sheets

COMBINED CYCLE RACK AND PARKING STAND

INTRODUCTION

As used herein the term cycle includes bicycles, motorcycles, scooters, tricycles and quadracycles. In certain sections I have, for the benefit of the reader, used the term bicycle since it makes the described operation and/or feature easier to understand.

BACKGROUND-FIELD OF INVENTION

This invention relates to a two-wheeled vehicle attachment for crying various items of recreational equipment and readily converting to a lockable stand that holds the bicycle upright while parked on sand or other surfaces.

BACKGROUND-DISCUSSION OF PRIOR ART (a) Previous cycle racks

Heretofore, cycle racks were attached to the frames by way of either nuts and bolts or welds. These racks were essentially permanent attachments that marred the paint on the bike when attached. Additionally, these racks are extremely limited in the size and shape of the equipment that they can safely carry.

In the case of a bicycle these racks rattled and decreased performance by adding weight when empty.

(b) Previous bicycle stands

A problem with all previous bicycle stands is that they required permanent attachment and were unable to work while in beach sand and other loose surfaces. They also were mounted with hardware that marred the paint of the bicycle frame.

Since the modern bicycle is a sophisticated machine with delicate gears and bearings the possibility of sand invading its parts is a real threat to its proper operation, safety and longevity.

OBJECTS AND ADVANTAGES

Accordingly, several objects and advantages of my invention are:

(a) to provide a safe way for cyclists to carry various large pieces of recreational equipment, such as surf boards boards and beach chairs.

(b) to provide an aerodynamic position on the cycle for large pieces of recreation equipment.

(c) to provide a device that can be quickly removed from the vehicle when not needed.

(d) to provide a way for people to reduce auto emissions, parking problems and transportation expenses by using their cycles instead of automobiles.

(e) to promote safety by offering an alternative to the unsafe practice of riding bicycles with only one hand on the handlebars while carrying things in the other hands.

(f) to allow a bicyclist to transport equipment directly onto the beach and park the bicycle in the sand in an upright position to protect its mechanical parts from sand invasion.

(g) to provide a stand to lock a bicycle to while on the beach.

(h) to provide a very light weight carrier.

(i) to be modern and stylish looking.

(j) to promote cycling as a viable means of transportation in place of the automobile.

(k) to provide a stand for storing a bicycle when not in use.

(l) to be cantilevered.

(m) further objects of my invention will become apparent from a consideration of the drawings and ensuring description of it.

REFERENCE NUMERALS IN DRAWINGS

| | |
|---|---|
| 10 main frame | 12 saddle attachment |
| 14 angle | 16 holder |
| 18 locking belt | 20 cross-bar |
| 21 sizing foam | 22 strap |
| 24 nose piece with hole | 26 wheel |
| 28 strap | 30 axle housing |
| 32 axle rod | 34 locking cap washer |
| 36 latch bar | |

DESCRIPTION-FIGS. 1, 2, 3, 10, 11

Figure 1:
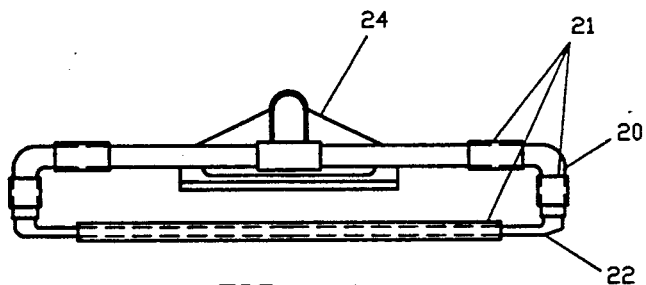
FIG. 1 is a view in detail of the cross bar assembly.
Figure 2:
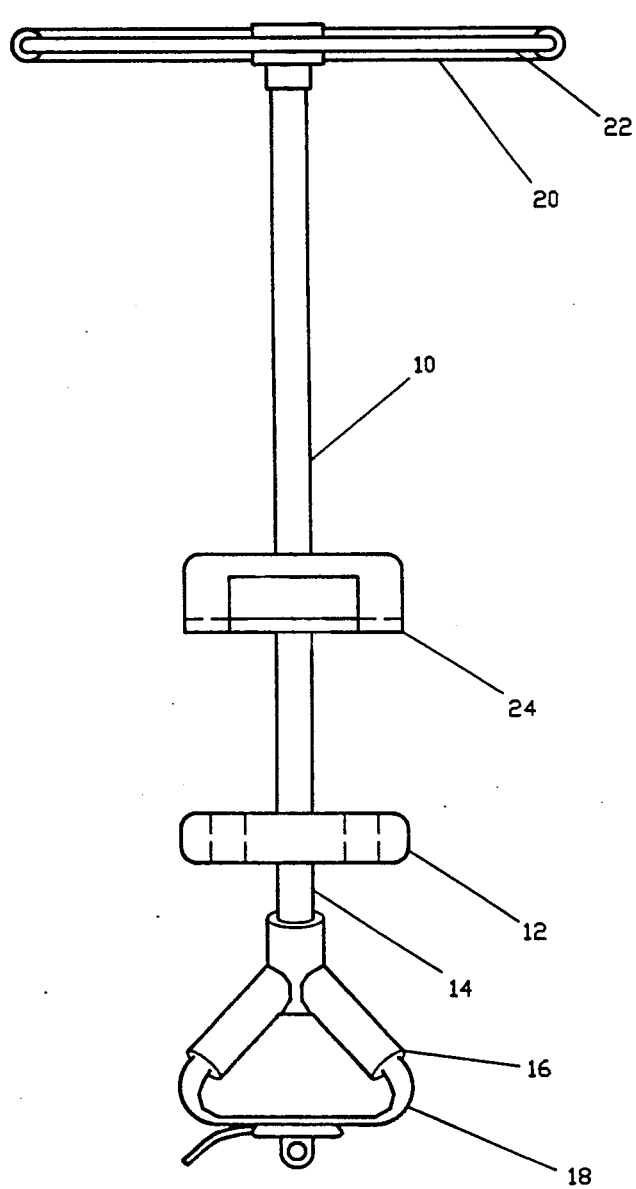
FIG. 2 is a top perspective view of my invention.
Figure 3:
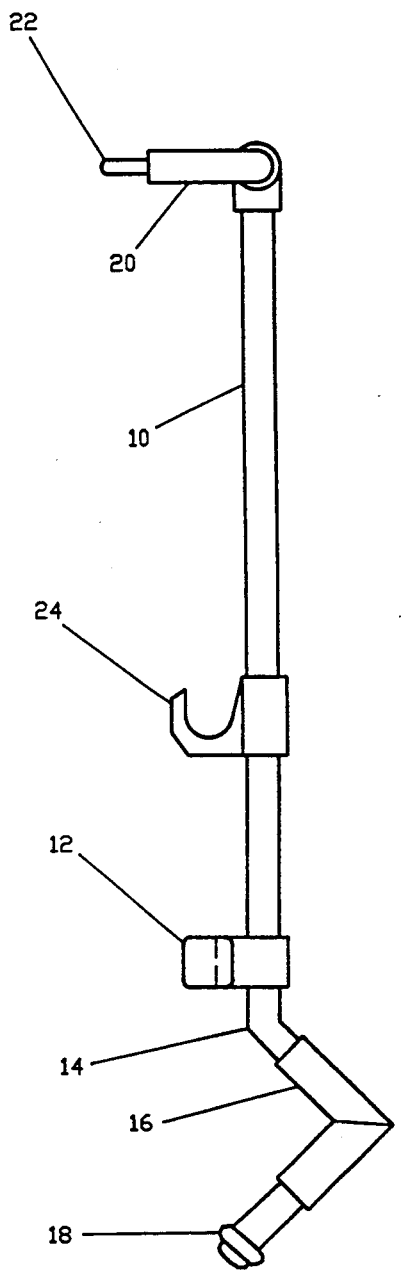
FIG. 3 is a side perspective view of my invention.

A typical embodiment of the structure of the present invention is illustrated in FIG. 2 (top view) and FIG. 3 (side view). The frame 10 is a rigid tube which includes a bend 14 of approximately 60 degrees. On the end closest to the bend is the holder 16 and the locking belt 18. There are various possibilities with regard to the actual shape and structure of the holder 16 and locking belt 18 as they function together with the saddle attachment 12 and angle 14 in attaching the device to a bicycle saddle.

Located along the frame 10 for a distance sufficient to be far enough behind the bicycle saddle so as not to interfere with a seated cyclist is the nose piece 24 which acts to secure the tip of a surfboard by docking it in its cupped shape or in its center hole (as appropriate for the cargo). Projecting further to the rear the frame 10 extends for a distance sufficient to provide adequate support and then mates with the cross-arm 20 and strap 22 assembly. The foam 21 allows the size of the opening to be adjusted and to protect cargo.

In its preferred embodiment the frame 10 and cross bar 20 is made as one piece of strong plastic tubing and the holder 16, the nose piece 24 and the saddle attachment 12 are made of unbreakable molded plastic. However, the use of any material of sufficient strength and rigidity to not fracture when subject to stress may be used, such as steel or aluminum bicycle tubing, PVC plastic and various impregnated or laminated fibrous materials. All straps can be nylon webbing, rubber core, flex cord, leather, coated cable and any other material supplying sufficient strength.

Figure 8:
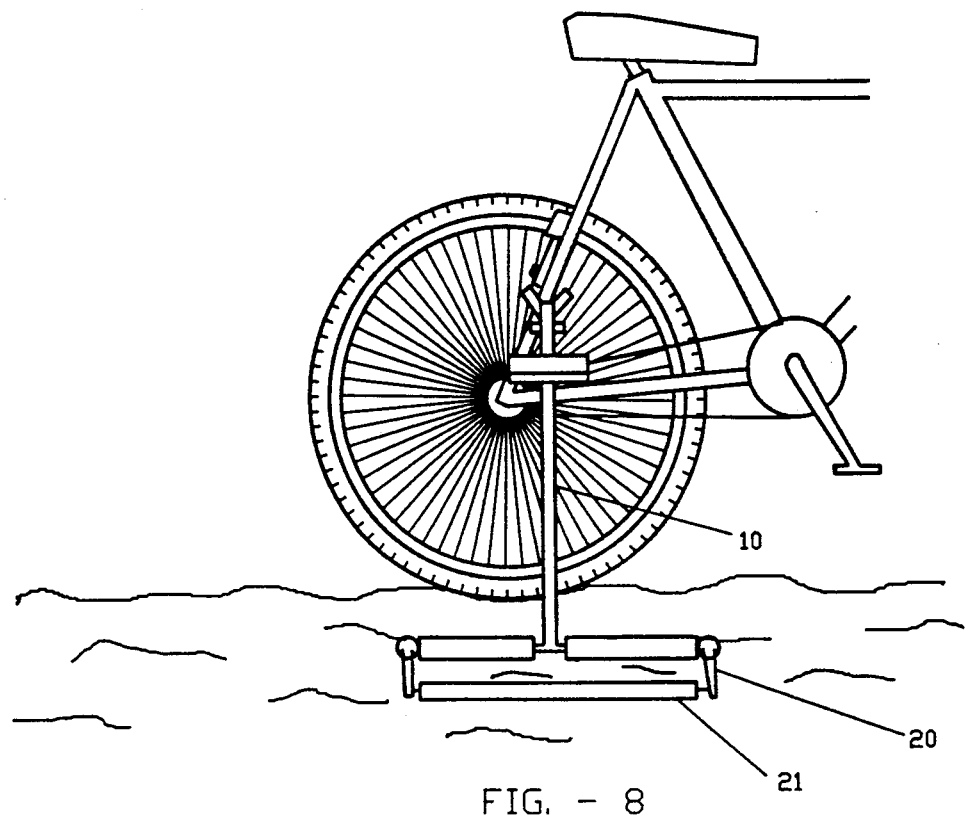
FIG. 8 is a perspective view of my invention in its parking rack operation.
Figure 9:
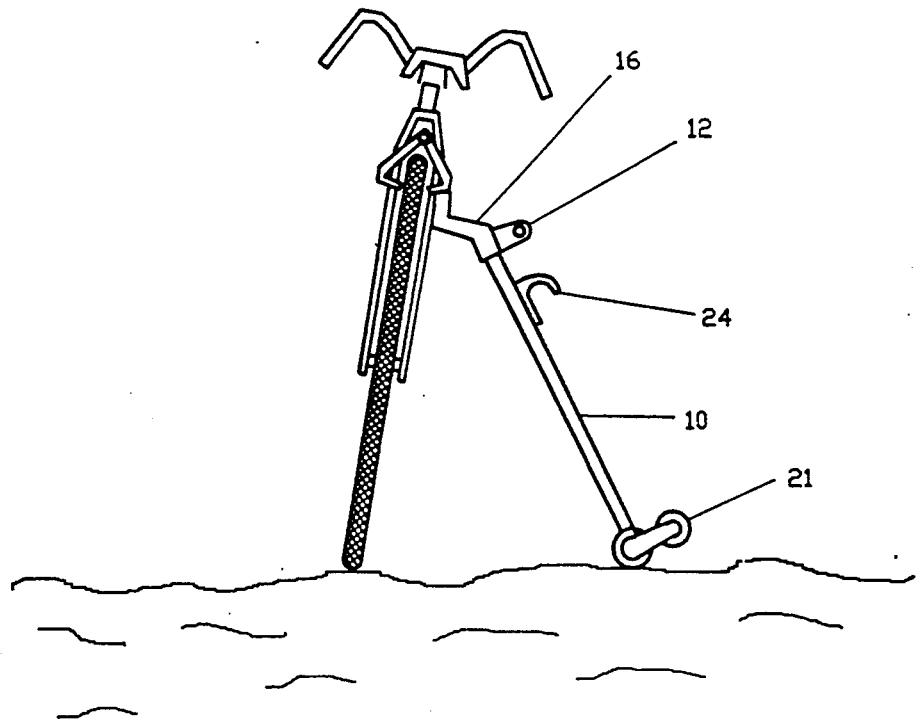
FIG. 9 is a rear view of my invention in its parking rack operation.

Because of the combined use of the device its overall length must be of a length which allows it to used in its function as a parking stand for a bicycle on a beach. As such the length of the frame 10 must be adequate so as to allow the cross-bar 20 assembly to be set on the ground approximately 12 inches away from and parallel to the rear wheel of a bicycle and, while in this position to allow the holder 16 and locking belt 18 to be attached on or about the top of the rear tire as shown in FIG. 8 and FIG. 9.

Figure 10:
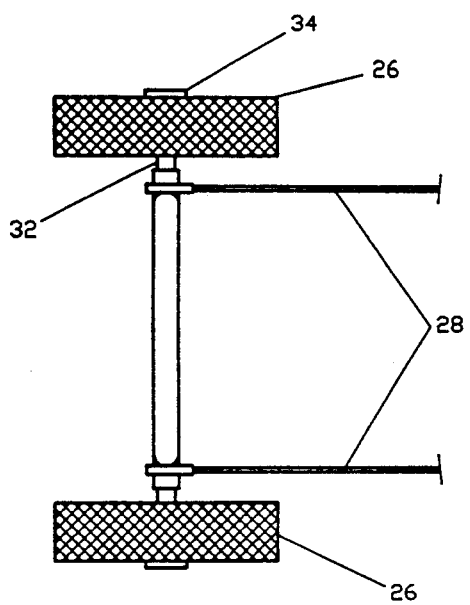
FIG. 10 is a bottom view of the truck assembly attachment.
Figure 11:
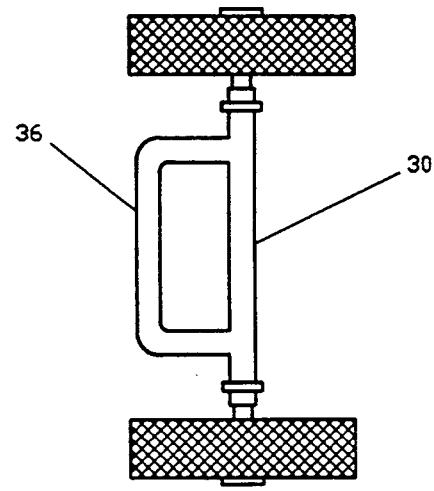
FIG. 11 is a side view of the truck assembly attachment.

In order to facilitate the transporting of very long times like full length surfboards and wind surfers the device shown in FIG. 10 and FIG. 11 must be used. This dolly attachment has an axle housing 30 attached to a latch bar 36. The axle rod 32 passes through the axle housing 30 and through the hubs of the wheels 26 where it is held in place by locking cap washers 34. The entire axle holder 30 and latch bar 36 structure rotates freely around the axle 32. When the tail of a surfboard is placed in the locking bar 36 the straps 28 are attached to the cross bar 20 and tightened to secure a positive connection. The holder 16 and locking strap 18 can then be attached to the vehicle.

OPERATION—FIGS. 4, 5, 6, 7, 8, 9, 12, 13

The manner of using my rack and parking stand is, I believe, unique. Since it is able to perform three operation I will describe each separately:

The Basic Rack

Figure 4:
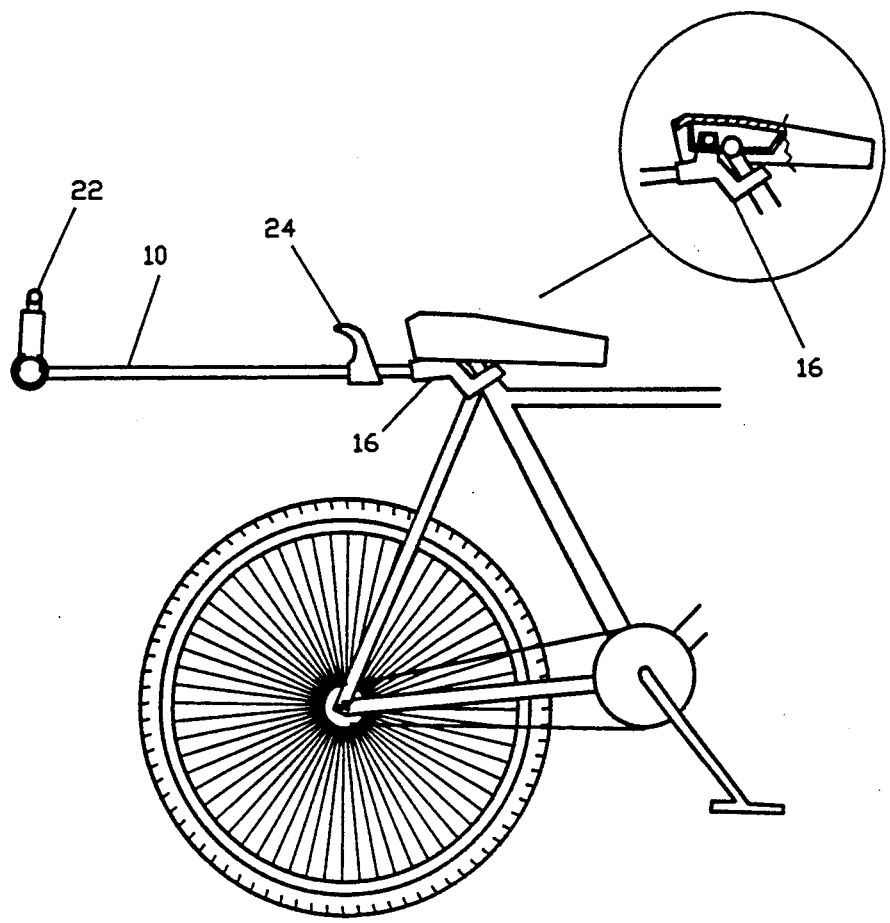
FIG. 4 is a side view showing my invention attached to a bicycle along with a side detail of the attachment point.
Figure 5:
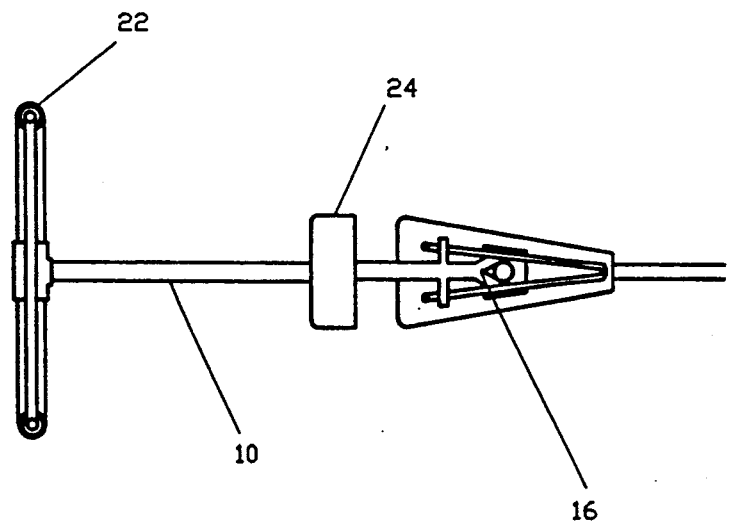
FIG. 5 is a top view of my invention attached to a typical bicycle saddle/seat post combination.
Figure 6:
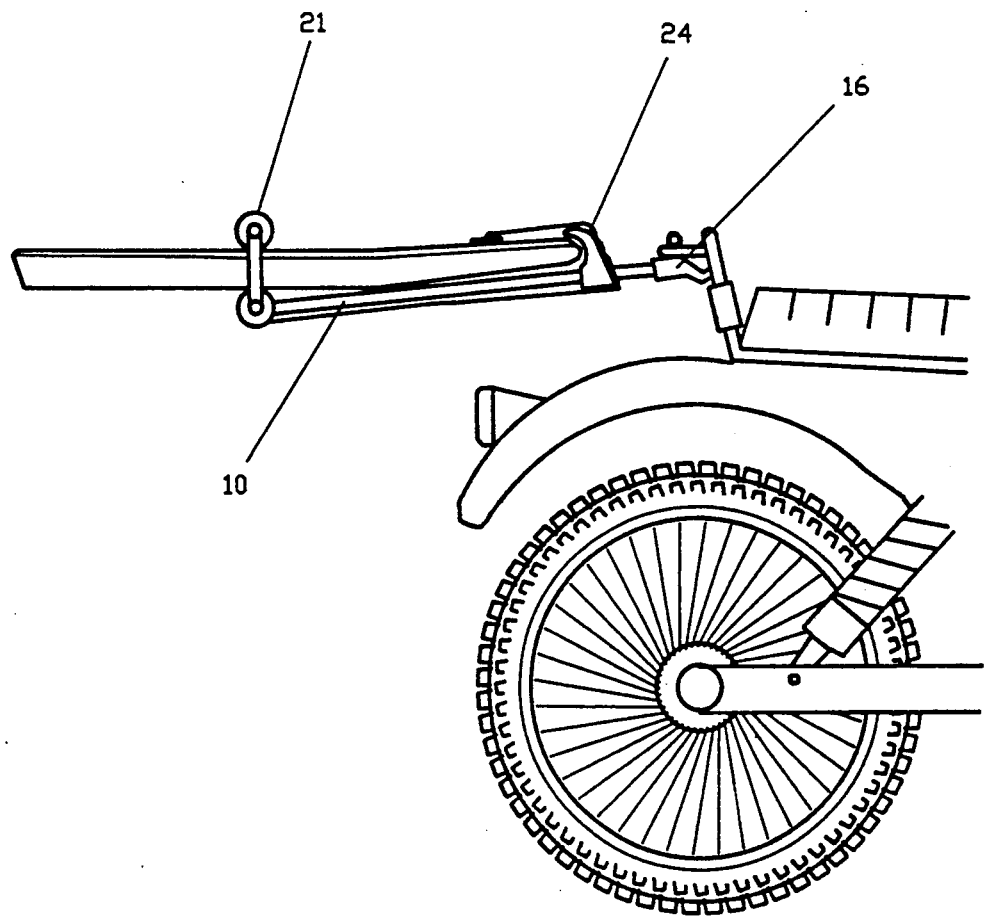
FIG. 6 is a side view of my invention carrying a soft foam surfboard while attached to a motor-cycle.
Figure 7:
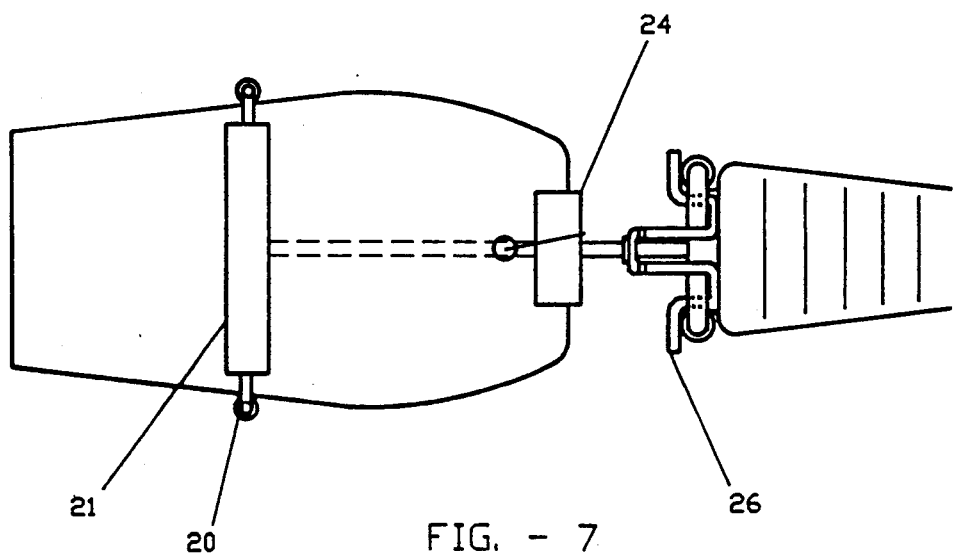
FIG. 7 is a top view of a typical motorcycle mounting adapter.

The basic rack as shown in FIG. 4 and FIG. 5 is attached to a bicycle and operates by first turning the saddle attachment 12 parallel to the saddle rails present on a standard bicycle saddle. Once the saddle attachment 12 is above the rails it is turned 45 degrees to rest in the position shown in FIG. 5 (it is now perpendicular to the rails). After this operation is complete the holder 16 is placed against the seat post of the bicycle and the locking strap 18 is tightened securely to the post. This attachment is now complete and the rack may be loaded with a foam surfboard as shown in FIG. 7 or other recreational equipment such as a folding beach chair.

The Paring Stand Operation

To use the rack as a parking stand it is detached from the bicycle by reversing the steps listed above and the then the cross-bar 20 is placed in the sand about 12 inches from and parallel to the real wheel. In the preferred embodiment, the holder 16 is then placed over the cantilevered brake arm projecting outward from the bicycle frame and the locking strap 18 is secured around the wheel of the bicycle and locked, providing security by locking the wheel to the stand.

Figure 12:
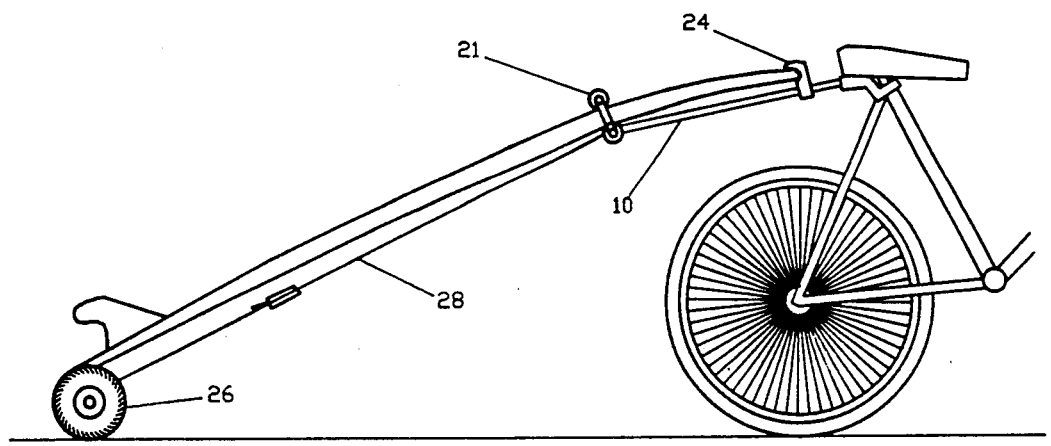
FIG. 12 is a side view of the device shown in FIG. 2 and the device shown in FIG. 11 attached to a bicycle and transporting a full size surfboard.
Figure 13:
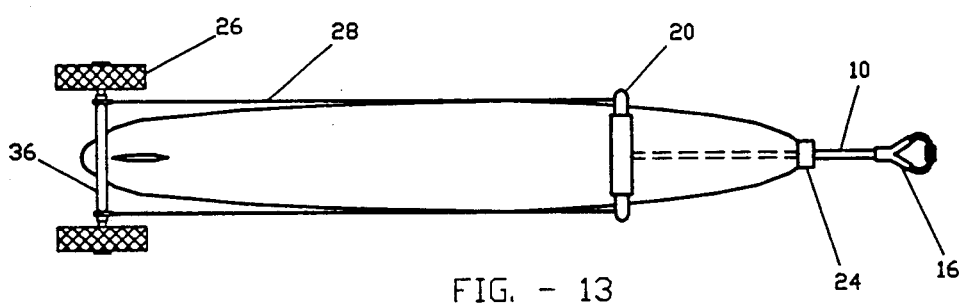
FIG. 13 is a top view of the method of attaching the device shown in FIG. 10 to the device shown in FIG. 2 while mounted on a full size surfboard.

The use of the wheel attachment is accomplished by inserting a surfboard with its fin pointing upwards as shown in FIG. 12, through the cross bar 20 and under the strap 22 with the tip of the board inserted into the nose piece 24. Then the tail of the board is inserted between the axle housing 30 and the latch bar 36 is pulled up against the fin. With this in place the straps 28 are attached to the cross-bar 20 and tightened.

In this configuration only the holder 16 and the locking strap 18 are attached to the vehicle since the rack must be able to swing around the seat post as the wheels trail behind. Therefore the saddle attachment 12 is simply not inserted under the saddle.

The steps for converting this rack back into a parking stand are identical to those described above.

SUMMARY, RAMIFICATIONS, AND SCOPE

Accordingly, the reader will see that the combined cycle rack and parking stand of this invention provides great utility and ease of use in operation. Its operation does not mar the painted surface of the vehicle and it may be attached and detached in a matter of seconds. Furthermore, the combined cycle rack and parking stand has the following additional advantages:

It permits a cyclist to safely transport recreational equipment that would otherwise require a automobile;

It allows a cycle to be taken onto the beach and parked upright without getting sand in its moving parts.

It provides safety by offering a reasonable alternative to the unsafe practice of carrying surfboards under one arm and thereby having only one hand on the handlebars of the cycle.

It is aerodynamic and reduces drag.

It provides security for a cycle at the beach.

It can be used to transport a variety of objects which heretofore could not safely and easily be transported by cycle.

It can, when removed from a cycle provide a carrying device for hand use.

It can be attached to a great variety of vehicle including but not limited to bicycles, motor scooters and motorcycles, boats, kayaks, automobiles, trucks and vans.

Although the description above contains many specificities, these should not be construed as limiting the scope of the invention but as merely providing illustrations of some of the presently preferred embodiments of this invention. For example, the rack and parking stand can have other shapes, such as oval, trapezoidal, triangular, etc.; it can incorporate a carrying bag for small items and be made in a variety of colors and sizes for different size cycles.

Thus the scope of the invention should be determined by the appended claims and their legal equivalents, rather than by the examples given.

I claim in combination:

1. A carrier rack for transporting a surfboard or the like on a two-wheeled cycle of the type having a cycle frame supporting a seat on a seat post, said carrier comprising:
    an elongated frame member having a mounting end and a supporting portion, said mounting end having bracket means for mounting said frame member to said cycle, and said supporting portions having reeving means for supporting said surfboard on said rack;
    said bracket means being sized and configured to removably mount said frame member in rearward cantilevered relation from said seat and seat post, said frame member being supported solely by said bracket means when cantilever mounted to said seat and seat post, said bracket means further being sized and configured to removably mount said frame member to a portion of said cycle frame when said brake means is removed from said seat and seat post;

said receiving means including a receiving loop mounted to an end of said frame member opposite said bracket means for receiving a surfboard or the like therethrough, a plane defined by said loop being oriented substantially transversely to the longitudinal axis of said frame member, said receiving means further including a nose piece mounted on said frame member intermediate said bracket means and said receiving loop, said nose piece having a recess for receiving a portion of said surfboard or the like;

whereby said frame member can be used as a carrier rack when cantilever mounted to said cycle, and can be used as a parking stand for said cycle when mounted to said cycle frame portion with said receiving loop engaging the cycle supporting surface.

* * * * *